(12) United States Patent
Berry

(10) Patent No.: US 10,388,263 B2
(45) Date of Patent: Aug. 20, 2019

(54) HEAT MOLDED, TRANSPARENT BAFFLE FOR INSTRUMENTAL SOUND DEFLECTION

(71) Applicant: William Russell Berry, Conroe, TX (US)

(72) Inventor: William Russell Berry, Conroe, TX (US)

(73) Assignee: William Russell Berry, Conroe, TX (US)

( * ) Notice: Subject to any disclaimer, the term of this patent is extended or adjusted under 35 U.S.C. 154(b) by 28 days.

(21) Appl. No.: 15/867,807

(22) Filed: Jan. 11, 2018

(65) Prior Publication Data

US 2018/0197524 A1 Jul. 12, 2018

Related U.S. Application Data

(60) Provisional application No. 62/445,089, filed on Jan. 11, 2017.

(51) Int. Cl.
| | |
|---|---|
| *B29C 51/00* | (2006.01) |
| *G10K 11/162* | (2006.01) |
| *B29C 51/26* | (2006.01) |
| *G10K 11/28* | (2006.01) |
| *B29C 51/08* | (2006.01) |
| *B29L 31/00* | (2006.01) |
| *B29K 69/00* | (2006.01) |

(52) U.S. Cl.
CPC .......... *G10K 11/162* (2013.01); *B29C 51/002* (2013.01); *B29C 51/08* (2013.01); *B29C 51/266* (2013.01); *B29C 51/268* (2013.01); *G10K 11/28* (2013.01); *B29K 2069/00* (2013.01); *B29L 2031/7724* (2013.01); *Y10T 428/218* (2015.01)

(58) Field of Classification Search
CPC ... Y10T 428/218; B29C 51/00; B29C 51/002; B29C 51/266; B29C 67/0011; B29C 69/001; G10K 11/28; G10K 11/162; B29L 2031/7724; B29K 2069/00
See application file for complete search history.

(56) References Cited

U.S. PATENT DOCUMENTS

2008/0245469 A1* 10/2008 Lin ................. B29C 43/021
156/243

* cited by examiner

*Primary Examiner* — Alexander S Thomas
(74) *Attorney, Agent, or Firm* — Adam K. Sacharoff; Much Shelist, P.C.

(57) ABSTRACT

A heat molded, transparent baffle for instrumental sound deflection is disclosed. The Baffle is a single, molded shield that reflects the sound in any direction the audio engineer decides. It is quickly mounted in one minute, transparent, and ready for sound check.

6 Claims, 4 Drawing Sheets

HEAT MOLDED, TRANSPARENT BAFFLE FOR INSTRUMENTAL SOUND DEFLECTION

CROSS REFERENCE TO RELATED APPLICATION

The present invention claims priority to U.S. Provisional Application 62/445,089 filed Jan. 11, 2017.

BACKGROUND OF THE INVENTION

The present invention relates to sound deflection baffles. With current baffles, the problem in the industry is that unrestrained sound waves created from drum cymbals and guitar amplifiers are more than likely picked up by the singer's microphones. The traditional enclosures are large, bulky, and ugly; creating a sense of isolationism from the other members of the band. As such it is desired to create a single, molded baffle shield that reflects the sound in any direction the audio engineer decides. The baffle should also be capable of quickly mounting to allow for a quick sound check. The baffle should also be transparent.

SUMMARY OF THE INVENTION

One or more of the embodiments provided in the present invention relates to a process of manufacturing a sound baffle, which includes the steps: (a) providing a polycarbonate square sheet; (b) placing the square sheet on an oven bed over a circular puck positioned about the center of the square sheet; (c) heating the square sheet at a temperate of X degrees for a predetermined period of time to create a raised molded center; (d) cutting the square sheet into a circular disc; and (e) drilling a hole in the middle of a raised molded center.

In other aspects of the invention, the square sheet is ⅛" to ³⁄₁₆" thick and is about a 30"×30" square. Yet other aspect of the invention include the circular puck being about 2 inches in diameter and ¹⁄₁₆ inches to 2.25 inches in height. In yet further aspect, the circular disc is 24 inches to 30 inches in diameter. In addition to one or more of these aspects, the hole may be about ½ inch in diameter. Finally, the heating of the square sheet may be done at a temperate of 220° F. and the predetermined period of time to create the raised molded center is 1-4 minutes.

Numerous other advantages and features of the invention will become readily apparent from the following detailed description of the invention and the embodiments thereof, from the claims, and from the accompanying drawings

DESCRIPTION OF THE DRAWINGS

A fuller understanding of the foregoing may be had by reference to the accompanying drawings, wherein.

DETAILED DESCRIPTION OF THE INVENTION

Figure 1:
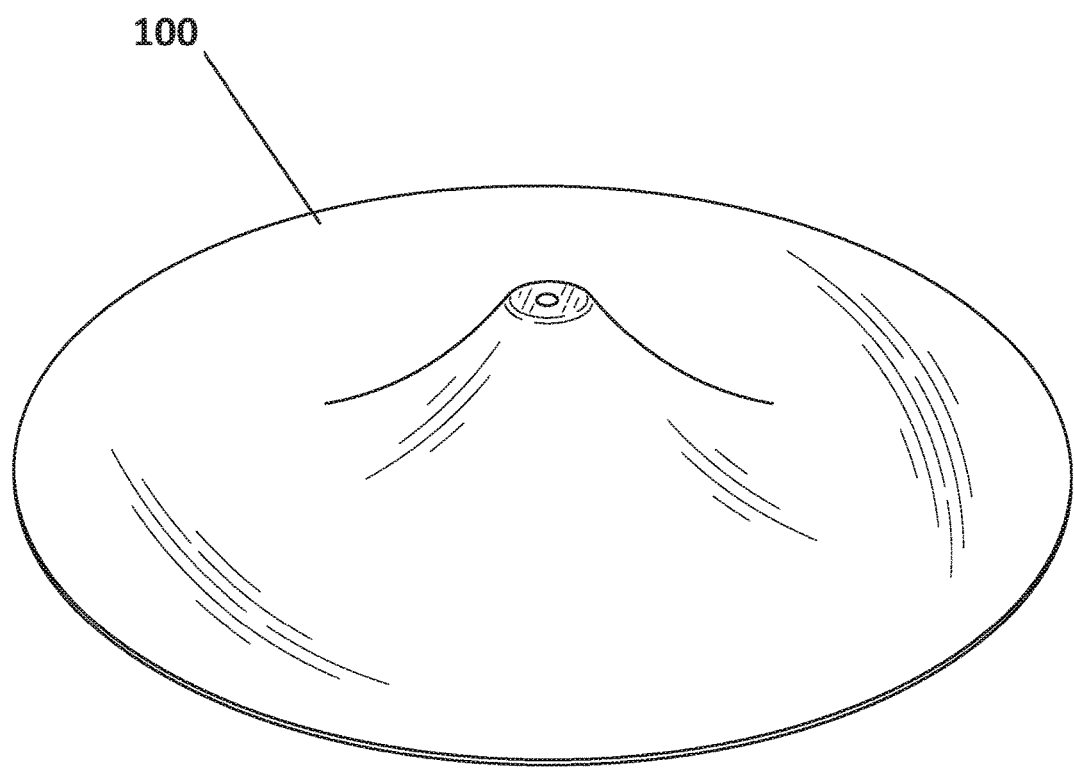
FIGS. 1 through 7 illustrated in various profiles a baffle in accordance with one embodiment of the present invention.
Figure 2:
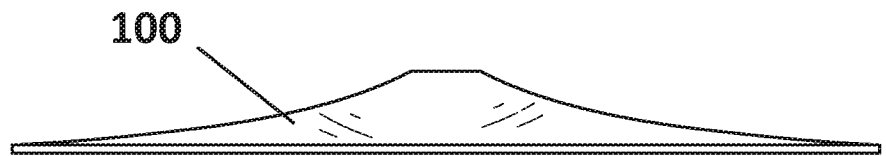
Figure 3:
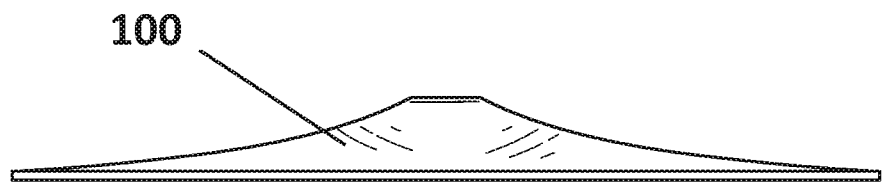
Figure 4:
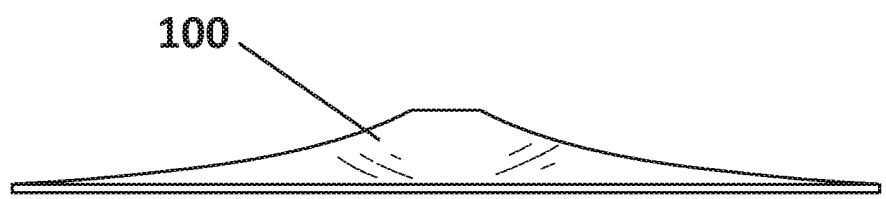
Figure 5:
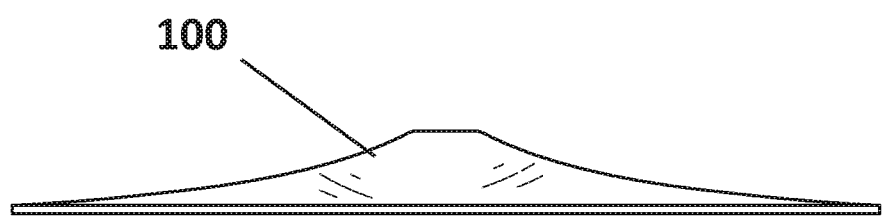
Figure 6:
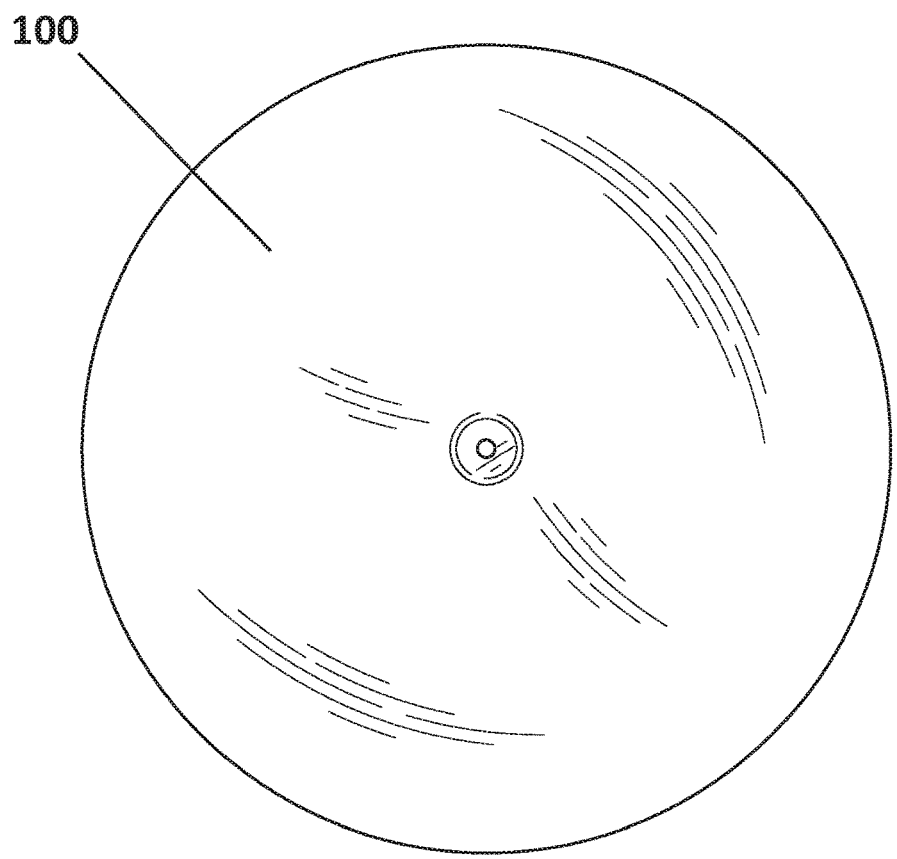
Figure 7:
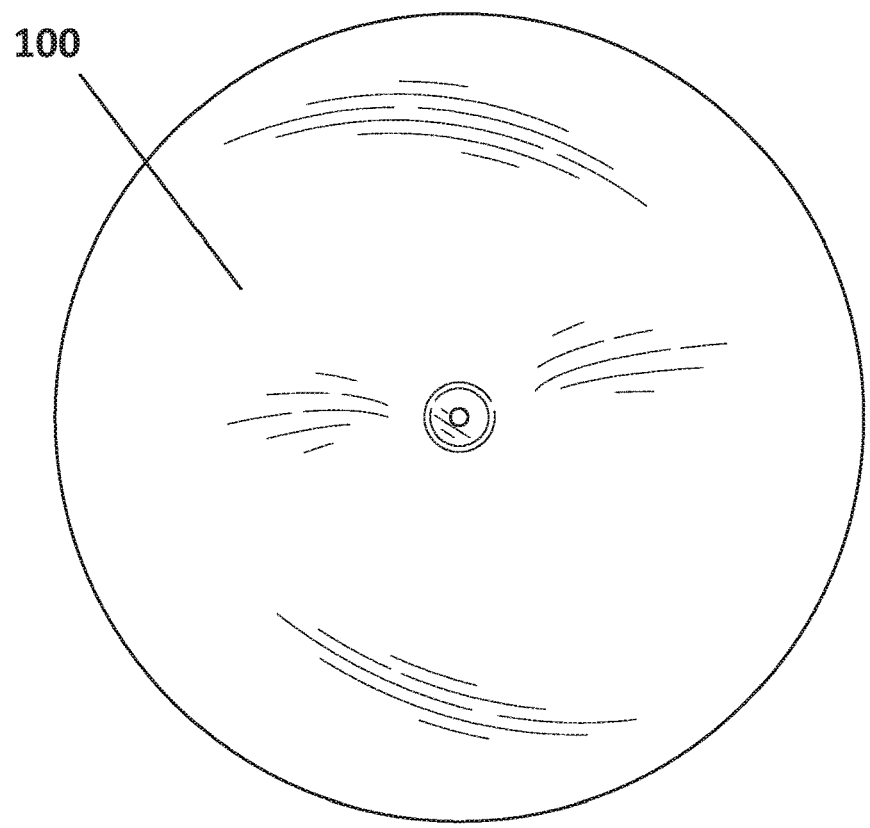

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

As stated above, the problem is unrestrained sound waves created from drum cymbals and guitar amplifiers that are picked up by the singer's microphones. The invention claimed here solves this problem.

Referring to FIG. 1-7, a Baffle 100 in accordance with one embodiment is a transparent, molded disc that is placed in front of cymbals and amplifiers to deflect the sound waves to the back of the stage versus in the singer's mic.

The claimed invention differs from what currently exists. Traditionally, a drummer is put inside a glass enclosure. They are isolated, tones are muffled, and the enclosures are aesthetically unpleasing. When a drummer is inside an enclosure, sound waves are reflecting off of multiple walls. The audio engineer is attempting to capture the best reflected and muffled tones bouncing around in the enclosure.

The Baffle 100 is a single, molded shield that reflects the sound in any direction the audio engineer decides. It is quickly mounted in one minute, transparent, and ready for sound check. The baffle 100 is a shield 24" to 30" in diameter and is almost invisible.

In one embodiment of the invention, the baffle 100 is manufactured under the following steps, which include:
1. A polycarbonate square sheet, ⅛" to ³⁄₁₆" thick and 30"×30" square.
2. The square sheet is placed on a heated oven bed; a circular puck 2" in diameter and ¹⁄₁₆" to 2.25" in height is placed under the square sheet.
3. The sheet is heated between a temperate between 200° F. and 250° F., and more preferably at 220° F. Full baking of the sheet is usually completed in about 1-4 minutes.
4. The sheet once baked cures relatively quickly in about 4 to 8 minutes.
5. After the molded center is created, the large polycarbonate disc is molded to the desired height, it is cut into a circular disc 24" to 30" in diameter/per customer request.
6. A ½" diameter hole is drilled in the middle of the raised molded area to allow for placement on a drum symbol stand.

Figure 9:
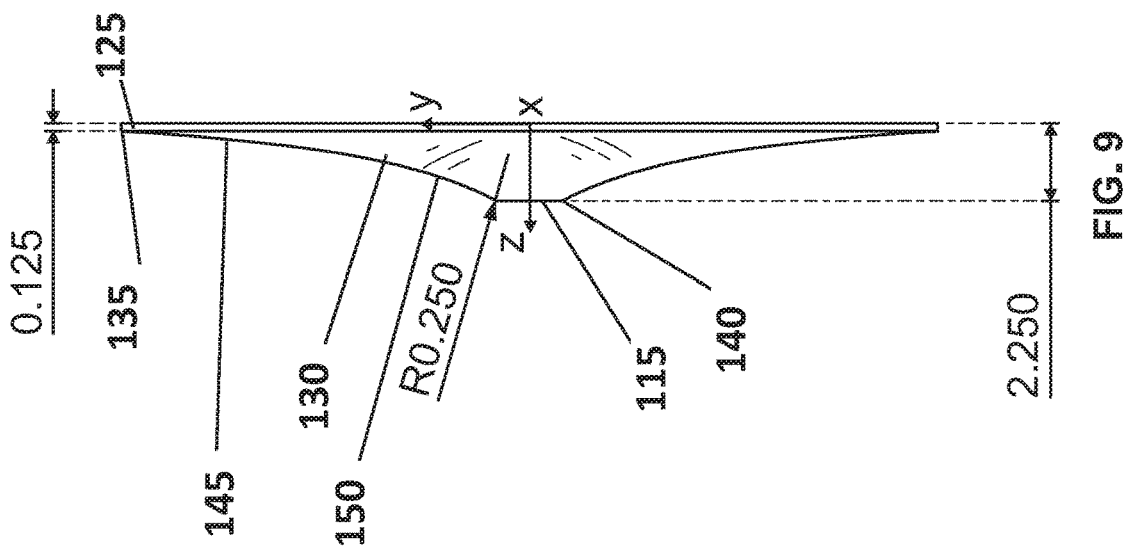
FIGS. 8 and 9 illustrated a baffle in accordance with another embodiment of the present invention.
Figure 8:
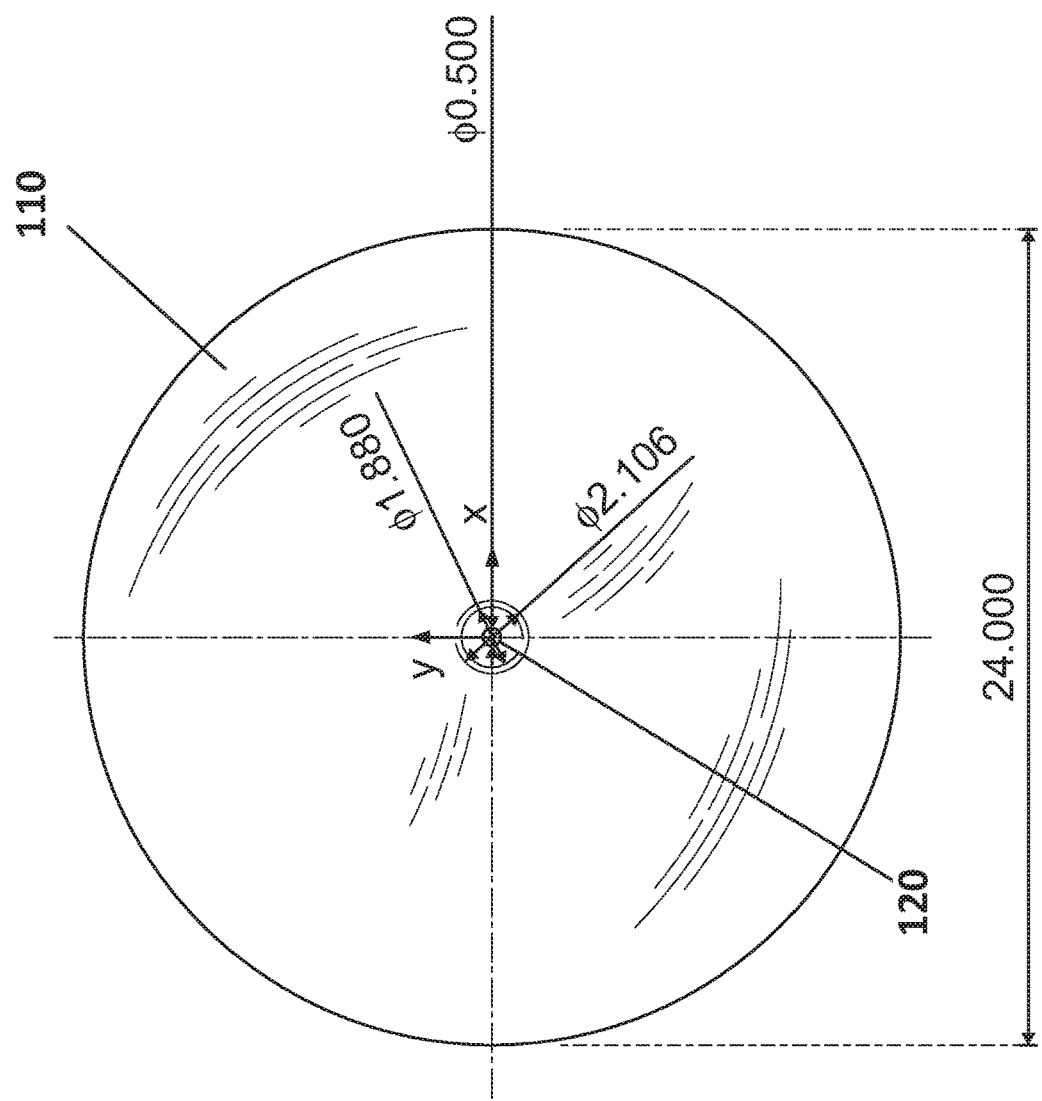

A baffle 110 in accordance with this embodiment is illustrated in FIGS. 8 and 9. In this embodiment the cap 115 has a radius is about 2.106 inches; with a ½ inch hole or bore 120 drilled through the center. The base 125 has a diameter of about 24 inches but may be larger depending on the customer request. The height Z of the baffle 110 from a center line X is about 2.250 inches (or the height of the puck). As such the height of the baffle may change depending on the customer request. Baffle is 0.125 Inches thick. The body 130 of the baffle rises from a base edge 135 to the cap edge 140 along an arcuate curvature of the body or sidewall.

An outer segment 145 of the body 130 (adjacent the base edge of the baffle) is configured with a radius of curvature which is relatively long. The outer segment transitions to an inner segment 150 of the body 130, which has a shorter radius of curvature as compared with the outer segment and terminates with a base portion cap edge 140 having a radius of curvature of 0.250 degrees.

The Baffle as provided by one or more of the embodiment disclosed herein is a single component of polycarbonate that is molded to perform sound deflection. The rise of the center and the diameter of the baffle are determined by audio engineers for maximum performance.

In use, the user only needs to place the baffle into the correct location per the audio engineer. Additionally: All music technology can be manipulated. The cost to digitally create the sound cost far more that the simple use of a Baffle.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

I claim:

1. A process of manufacturing a sound baffle comprising the steps:
   providing a polycarbonate square sheet;
   placing the square sheet on an oven bed over a circular puck positioned about the center of the square sheet;
   heating the square sheet at a temperate of X degrees for a predetermined period of time to create a raised molded center;
   cutting the square sheet into a circular disc; and
   drilling a hole in the middle of a raised molded center.

2. The process of claim 1, wherein the square sheet is ⅛" to 3/16" thick and is about a 30"×30" square.

3. The process of claim 1, wherein the circular puck is about 2 inches in diameter and 1/16 inches to 2.25 inches in height.

4. The process of claim 1, wherein the circular disc is 24 inches to 30 inches in diameter.

5. The process of claim 1, wherein hole is about ½ inch in diameter.

6. The process of claim 1, wherein the heating the square sheet is done at a temperate of 220° F. and the predetermined period of time to create the raised molded center is 1-4 minutes.

* * * * *